United States Patent
Zhou et al.

(10) Patent No.: US 11,576,163 B2
(45) Date of Patent: Feb. 7, 2023

(54) PARAMETER OVERWRITING RULES FOR MULTIPLE SPS/CG CONFIGURATIONS

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Jing Sun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 49 days.

(21) Appl. No.: 16/902,661

(22) Filed: Jun. 16, 2020

(65) Prior Publication Data

US 2020/0404632 A1 Dec. 24, 2020

Related U.S. Application Data

(60) Provisional application No. 62/864,297, filed on Jun. 20, 2019.

(51) Int. Cl.
*H04W 4/00* (2018.01)
*H04W 72/04* (2023.01)
*H04W 72/14* (2009.01)

(52) U.S. Cl.
CPC ......... *H04W 72/042* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 2012/0314680 A1* | 12/2012 | Kela | H04W 72/042 370/329 |
| 2018/0139734 A1* | 5/2018 | Babaei | H04W 72/0406 |
| 2018/0199359 A1* | 7/2018 | Cao | H04L 5/0096 |
| 2019/0014563 A1* | 1/2019 | Lee | H04L 5/0042 |
| 2019/0116609 A1* | 4/2019 | Feng | H04W 72/042 |
| 2019/0215862 A1* | 7/2019 | Kim | H04W 74/006 |
| 2019/0261395 A1* | 8/2019 | Goektepe | H04W 72/1205 |
| 2020/0022174 A1* | 1/2020 | Karaki | H04W 72/0453 |
| 2020/0322939 A1* | 10/2020 | Cao | H04W 72/02 |

(Continued)

OTHER PUBLICATIONS

International Search Report and Written Opinion—PCT/US2020/038234—ISA/EPO—Sep. 11, 2020.

(Continued)

*Primary Examiner* — Clemence S Han
(74) *Attorney, Agent, or Firm* — Arent Fox, LLP

(57) ABSTRACT

A user equipment (UE) may be provisioned with multiple semi-persistent scheduling (SPS) configurations and/or semi-static configured grants (CGs). The UE may receive a first message indicating a first set of parameters for a first SPS configuration or for a first CG. The UE may receive a second message including at least one updated parameter for a SPS configuration or a CG. The UE may determine that the second message is applicable to one or more SPS configurations or CGs including the first SPS configuration or the first CG. The UE may overwrite a corresponding parameter of the first set of parameters with the at least one updated parameter. The UE may receive according to the first SPS configuration or transmit according to the first CG based on the at least one updated parameter.

20 Claims, 7 Drawing Sheets

(56) References Cited

U.S. PATENT DOCUMENTS

| | | | |
|---|---|---|---|
| 2021/0068100 A1* | 3/2021 | Takeda | H04W 72/0413 |
| 2021/0084596 A1* | 3/2021 | Lee | H04W 52/247 |
| 2021/0084639 A1* | 3/2021 | Höglund | H04W 76/27 |
| 2021/0100001 A1* | 4/2021 | Höglund | H04L 5/0053 |
| 2021/0204313 A1* | 7/2021 | Takeda | H04W 72/14 |
| 2021/0227513 A1* | 7/2021 | Takeda | H04W 72/042 |

OTHER PUBLICATIONS

NTT Docomo: "Multiple SPS Support for Sidelink and Uplink V2X", 3GPP TSG RAN WG1 Meeting #86bis, 3GPP Draft; R1-1610037 LTE V2X SPS, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), pp. 1-5, XP051150062, Retrieved from the Internet: URL: http://www.3gpp.org/ftp/Meetings_3GPP_SYNC/RAN1/Docs/ [retrieved on Oct. 9, 2016] paragraph [0002], p. 4.

* cited by examiner

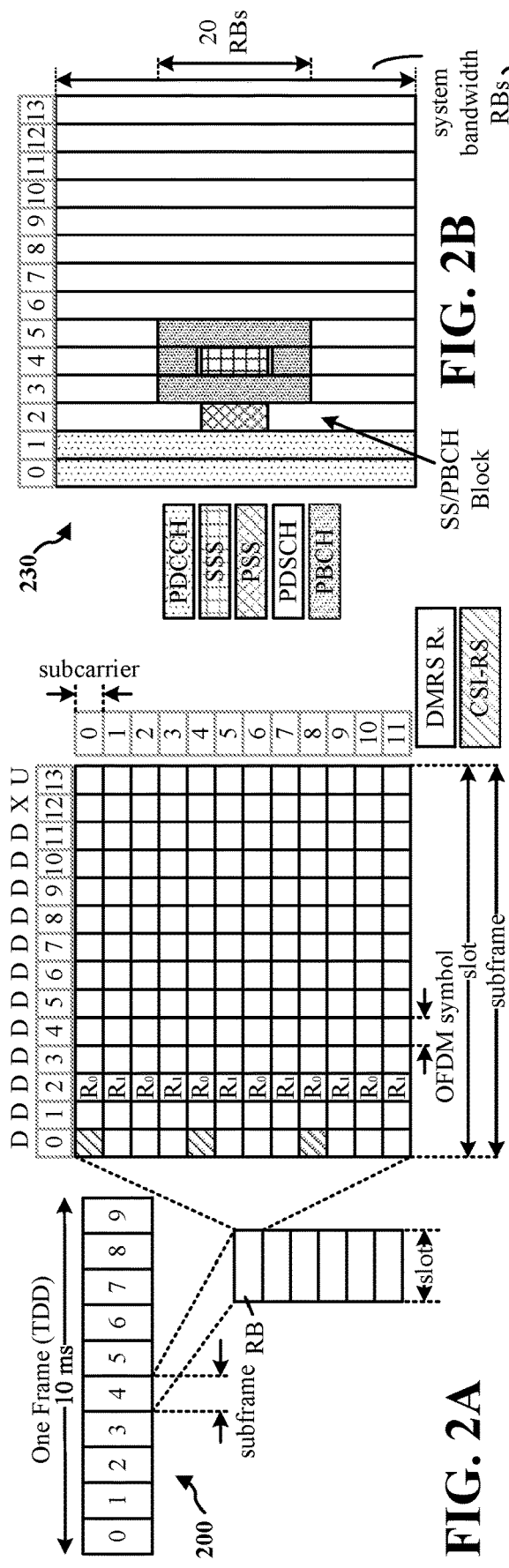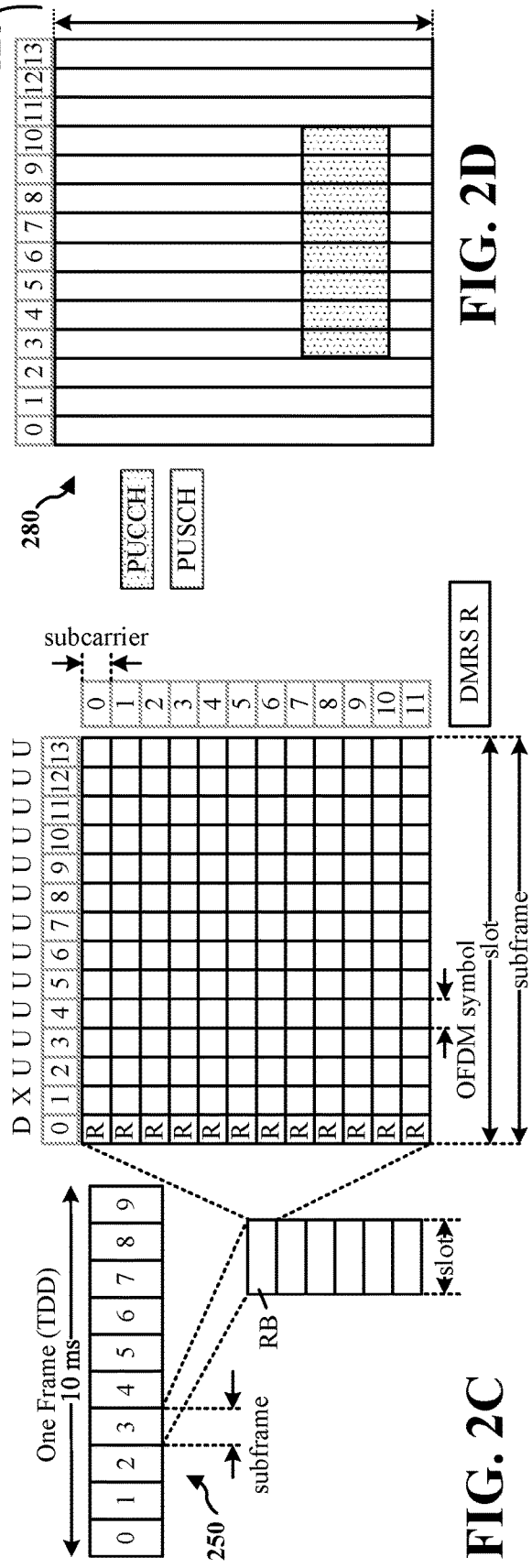

PARAMETER OVERWRITING RULES FOR MULTIPLE SPS/CG CONFIGURATIONS

This application claims priority to U.S. Provisional Application No. 62/864,297 titled "PARAMETER OVERWRITING RULES FOR MULTIPLE SPS/CG CONFIGURATIONS," filed Jun. 20, 2019, which is assigned to the assignee hereof, and incorporated herein by reference in its entirety.

BACKGROUND

Technical Field

The present disclosure relates generally to communication systems, and more particularly, to techniques for semi-persistent and semi-static scheduling.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these or other like technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided that facilitate update of one or more semi-persistent scheduling (SPS) configurations or configured grants (CGs). The method may include receiving a first message indicating a first set of parameters for a first SPS configuration or for a first CG. The method may include receiving a second message including at least one updated parameter for a SPS configuration or a CG. The method may include determining that the second message is applicable to one or more SPS configurations or CGs including the first SPS configuration or the first CG. The method may include overwriting a corresponding parameter of the first set of parameters with the at least one updated parameter. The method may include receiving according to the first SPS configuration or transmitting according to the first CG based on the at least one updated parameter.

In an aspect, the disclosure provides an apparatus for wireless communication. The apparatus may include a memory storing computer-executable instructions and at least one processor coupled to the memory and configured to execute the instructions. The processor may be configured to receive a first message indicating a first set of parameters for a first SPS configuration or for a first CG. The processor may be configured to receive a second message including at least one updated parameter for a SPS configuration or a CG. The processor may be configured to determine that the second message is applicable to one or more SPS configurations or CGs including the first SPS configuration or the first CG. The processor may be configured to overwrite a corresponding parameter of the first set of parameters with the at least one updated parameter. The processor may be configured to receive according to the first SPS configuration or transmit according to the first CG based on the at least one updated parameter.

In an aspect, the disclosure provides another apparatus for wireless communication, the apparatus may include means for receiving a first message indicating a first set of parameters for a first SPS configuration or for a first CG. The apparatus may include means for receiving a second message including at least one updated parameter for a SPS configuration or a CG. The apparatus may include means for determining that the second message is applicable to one or more SPS configurations or CGs including the first SPS configuration or the first CG. The apparatus may include means for overwriting a corresponding parameter of the first set of parameters with the at least one updated parameter. The apparatus may include means for receiving according to the first SPS configuration based on the at least one updated parameter. The apparatus may include means for transmitting according to the first CG based on the at least one updated parameter.

In an aspect, the disclosure provides a non-transitory computer-readable medium storing computer executable code. The non-transitory computer-readable medium may include code to receive a first message indicating a first set of parameters for a first SPS configuration or for a first CG. The non-transitory computer-readable medium may include code to receive a second message including at least one updated parameter for a SPS configuration or a CG. The non-transitory computer-readable medium may include code to determine that the second message is applicable to one or more SPS configurations or CGs including the first SPS configuration or the first CG. The non-transitory computer-readable medium may include code to overwrite a corresponding parameter of the first set of parameters with the at least one updated parameter. The non-transitory computer-readable medium may include code to receive according to the first SPS configuration or transmit according to the first CG based on the at least one updated parameter.

In another aspect, the disclosure provides a method of wireless communication that may be performed by a base station. The method may include transmitting a first message indicating a first set of parameters for a first SPS configuration or for a first CG. The method may include determining an update to at least one parameter of the first SPS configuration or the first CG. The method may include overwriting a corresponding parameter of the first set of parameters with the at least one updated parameter. The method may include transmitting a second message including the at least one updated parameter for the first SPS configuration or the first CG. The method may include transmitting according to the first SPS configuration or receiving according to the first CG based on the at least one updated parameter.

The disclosure also provides apparatuses and a non-transitory computer-readable medium that perform the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of DL channels within a subframe, in accordance with certain aspects of the present description.

FIG. 2C is a diagram illustrating an example of a second frame, in accordance with certain aspects of the present description.

FIG. 2D is a diagram illustrating an example of a subframe, in accordance with certain aspects of the present description.

DETAILED DESCRIPTION

Figure 1:
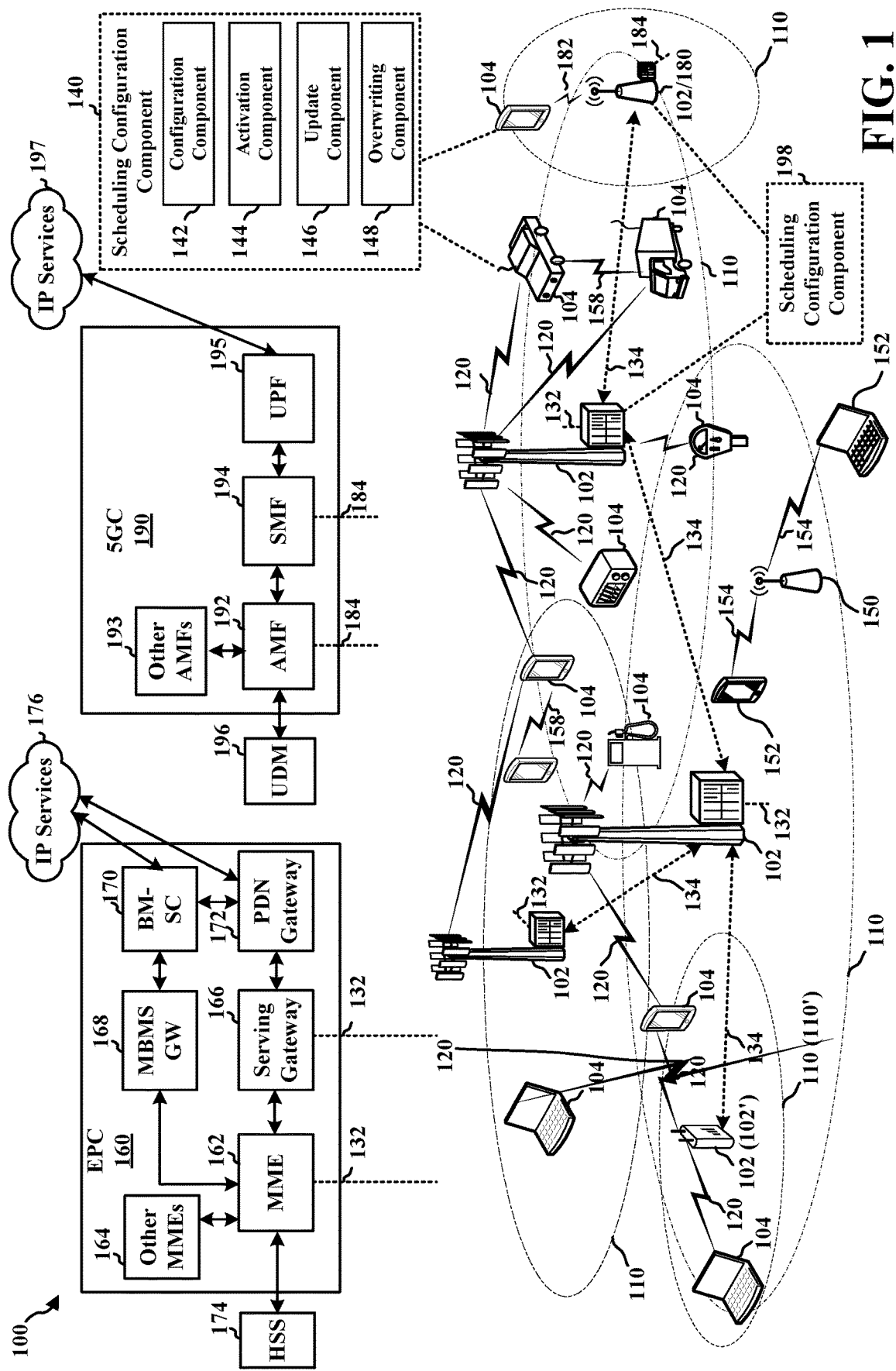
FIG. 1 is a diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Downlink semi-persistent scheduling (SPS) may utilize a configuration (e.g., SPS configuration) and activation approach to schedule a UE to receive a PDSCH without a PDCCH for every transmission. An SPS configuration may be established, for example, via radio-resource control (RRC) signaling. The SPS configuration may include parameters such as a periodicity, a hybrid automatic repeat request (HARQ) resource on physical uplink control channel (PUCCH), a number of HARQ processes for SPS, etc. The HARQ resource may carry an acknowledgment (ACK) or negative acknowledgment (NACK) indicating whether the PDSCH was correctly received. The activation may be carried on a PDCCH downlink control information (DCI) scrambled with a configured scheduling radio network temporary identifier (CS-RNTI). For example, the DCI activating or deactivating an SPS configuration may use DCI format 1_0 or DCI format 1_1. The DCI may include additional parameters of the SPS for the PDSCH. For example, the DCI may specify frequency domain resources, time domain resources, a modulation and coding scheme (MCS), a demodulation reference signal (DMRS) port, a scrambling identifier for DMRS sequence generation, transmission configuration indicator (TCI) state, or quasi co-location (QCL) type. A base station may transmit according to an active SPS configuration and the UE may receive according to the SPS configuration until the active SPS configuration is deactivated.

Similarly, an uplink semi-static configured grant (CG) may be established, for example, via RRC signaling for uplink scheduling without a DCI for every transmission. The term "scheduling configuration" may be used herein to refer to either a SPS configuration or a CG. The CG may include parameters such as a periodicity, a HARQ resource on physical downlink control channel (PDCCH), a number of HARQ processes for CG, etc. The HARQ resource may carry an ACK or NACK indicating whether the PUSCH was correctly received. The activation may be carried on a PDCCH DCI scrambled with a CS-RNTI. For example, the DCI activating or deactivating a CG may use DCI format 0_0 or DCI format 0_1. The DCI may include additional parameters of the CG for the PUSCH. For example, the DCI may specify frequency domain resources, time domain resources, a MCS, a DMRS port, a scrambling identifier for DMRS sequence generation, SRS resource indicator, spatial relation info, or beam indication and redundancy version per repetition in case of PUSCH repetition. In another aspect, the RRC signaling that configures the uplink semi-static CG may include all uplink parameters and the UE may transmit according to the CG without an activation DCI.

In an aspect, the configuration and activation approach for SPS and CG may not allow a change in configured parameters. For example, if channel conditions change, the base station may need to disable a current SPS or CG, then configure and activate a new SPS or CG for the UE. If multiple SPS configurations or CG are configured, each SPS configuration and/or CG may need to be individually deactivated and new SPS configurations and/or CGs may need to be configured, and activated.

In an aspect, the present disclosure provides techniques to update one or more existing SPS configurations or CGs by overwriting one or more parameters based on at least one parameter received in an update message. Unless otherwise stated the terms "overwrite" and "overwriting" or the like as used herein, are intended to represent and include all of the various ways that data representing parameter values may be generated, updated, replaced, or otherwise modified. Thus, for example, a value stored in memory may be physically (e.g., new bit(s) stored) or logically (e.g., pointer to a new value stored elsewhere in memory may be provided) overwritten with a same or different value. In another example, a value may be overwritten by way of one or more processes that may generate or otherwise obtain newly resulting data, some or all of which may represent one or more updated parameter(s)/value(s). Furthermore, in certain examples, an overwritten or otherwise updated parameter value may include one or more parameters/values being newly provided, and/or conversely one or more previously provided parameters/values being removed (e.g., no longer provided).

A UE may receive the update message and determine one or more SPS configurations and/or CGs to which the update message applies. The UE may overwrite corresponding parameters of the SPS configurations and/or CGs with the at least one parameter received in the update message. The UE may then receive and/or transmit according to the updated SPS configuration or CG. In an aspect, the ability to overwrite one or more parameters of an existing configuration may reduce the need to disable an old configuration and configure and activate a new configuration. Accordingly, the disclosed techniques may reduce signaling associated with semi-persistent and semi-static scheduling.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

In certain aspects, one or more of the UEs 104 may include a scheduling configuration component 140 configured to manage one or more SPS configurations or CGs by overwriting one or more parameters based on an update message. The scheduling configuration component 140 may include a configuration component 142 configured to receive SPS configuration information and/or CG configuration information from one or more base stations. The scheduling configuration component 140 may include an activation component 144 configured to receive a DCI indicating activation or deactivation of an SPS configuration and/or CG. The scheduling configuration component 140 may include an update component 146 configured to receive an update message including at least one updated parameter for an SPS configuration and/or CG and determine whether the update message is applicable to one or more SPS configurations and/or CGs. The scheduling configuration component 140 may include an overwriting component 148 configured to overwrite one or more corresponding parameters of a configured SPS configuration or CG based on the at least one updated parameter. The scheduling configuration component 140 may also include or control a transceiver 502 (FIG. 5) for receiving according to an updated SPS configuration or transmitting according to an updated CG based on the at least one updated parameter.

Figure 7:
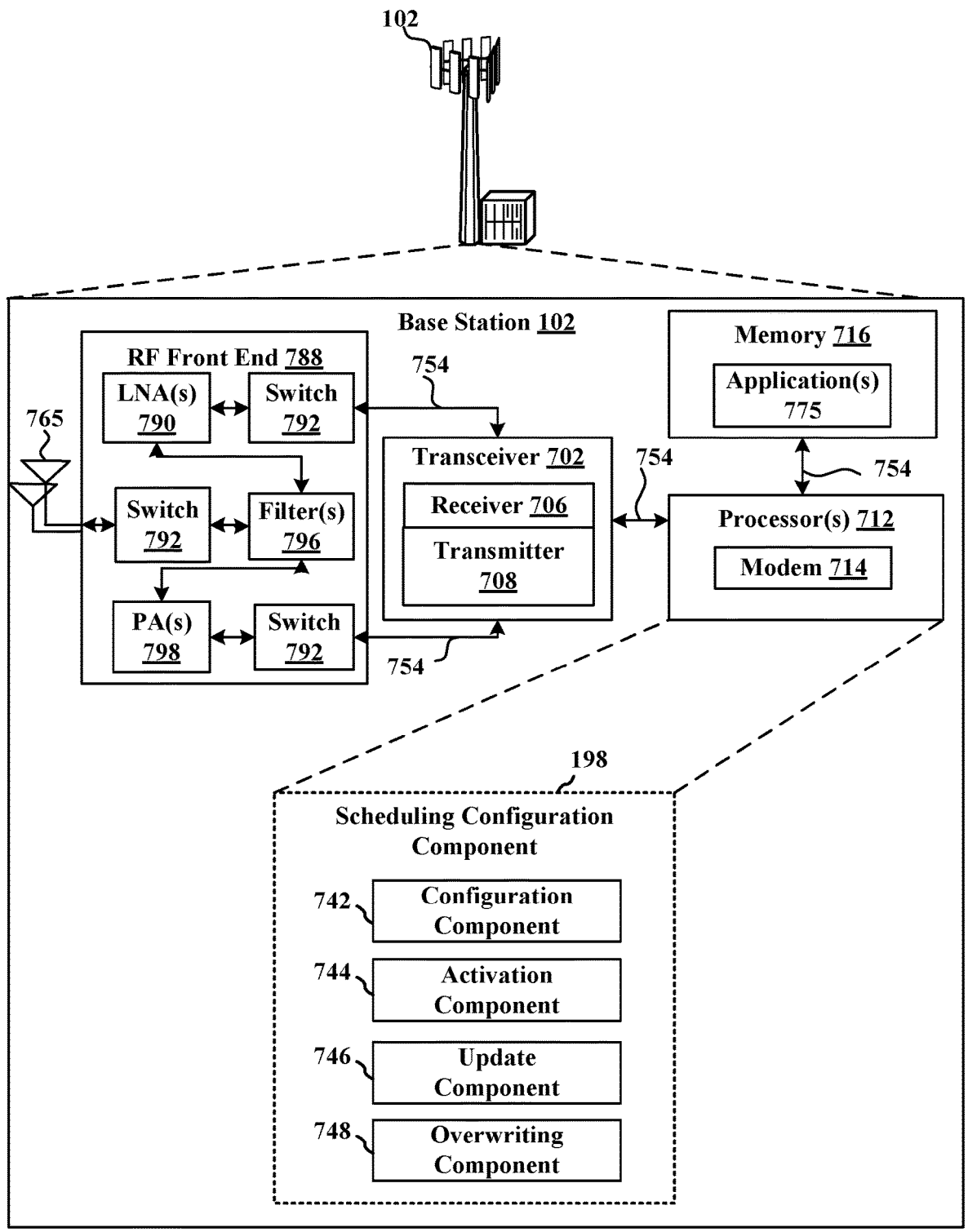
FIG. 7 is a schematic diagram of example components of the base station of FIG. 1, in accordance with certain aspects of the present description.

In certain aspects, one or more of the base stations 102 may include a scheduling configuration component 198 configured to manage one or more SPS configurations or CGs in cooperation with the scheduling configuration component 140 of a UE 104. As illustrated in FIG. 7, the scheduling configuration component 198 may include a configuration component 742 and/or an activation component 744 configured to transmit a first message indicating a first set of parameters for a first SPS configuration or for a first CG. For example, the configuration component 742 may transmit a SPS configuration or CG and the activation component 744 may transmit a DCI indicating activation of the SPS configuration and/or CG. The scheduling configuration component 198 may include an update component 746 configured to determine an update to at least one parameter of the first SPS configuration or the first CG. The scheduling configuration component 198 may include an overwriting component 748 overwrite a corresponding parameter of the first set of parameters with the at least one updated parameter. The scheduling configuration component 198 may transmit a second message including the at least one updated parameter for the first SPS configuration or the first CG. The scheduling configuration component 198 may transmit according to the first SPS configuration or receive according to the first CG based on the at least one updated parameter.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same (e.g., 5 GHz, or the like) unlicensed frequency spectrum as may be used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
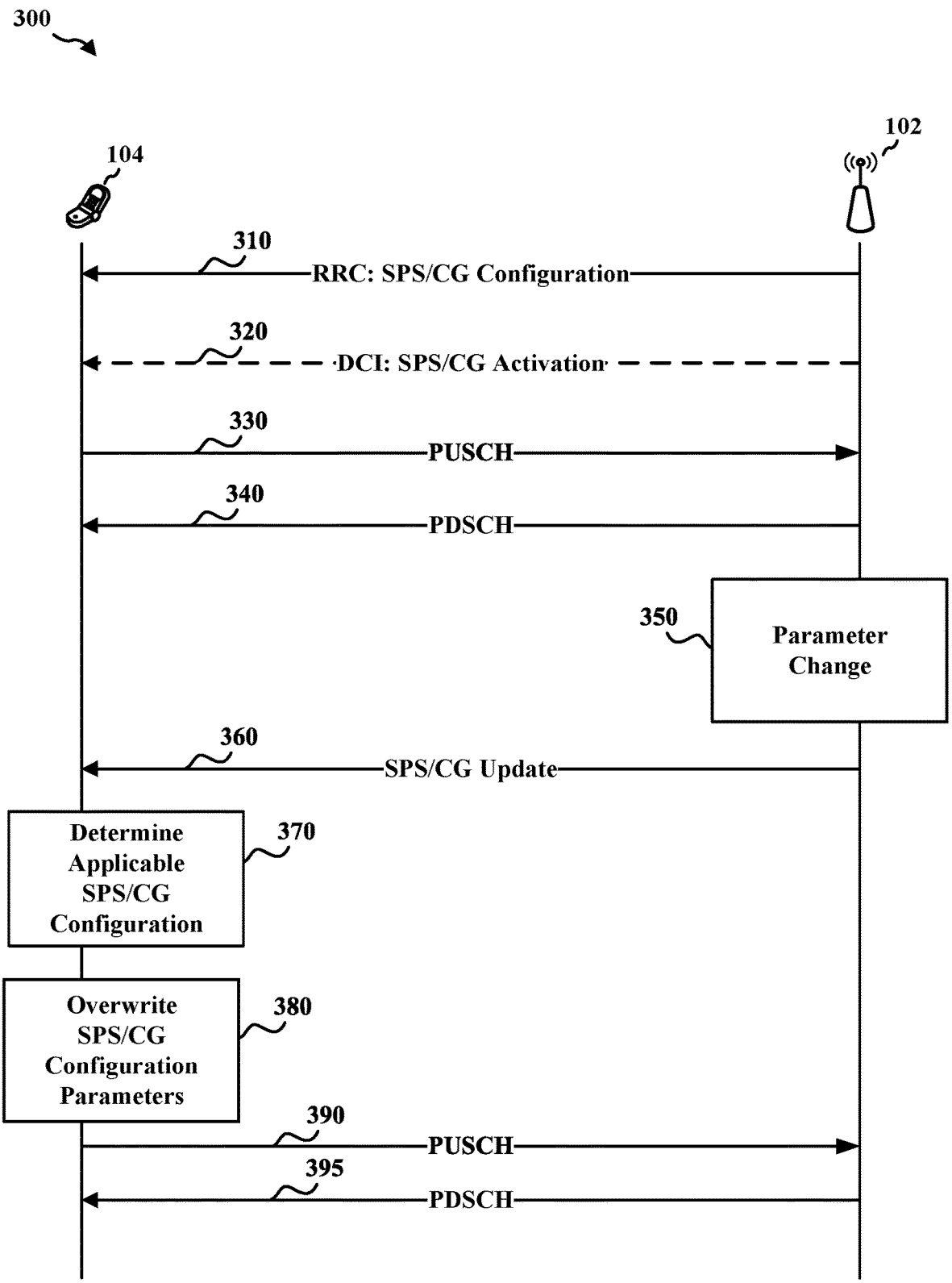
FIG. 3 is a message diagram illustrating example messages and processes for updating a scheduling configuration for a UE, in accordance with certain aspects of the present description.

FIG. 3 is a message diagram showing example messages between a base station 102 and a UE 104 for performing updating of parameters for semi-persistent or semi-static scheduled transmissions.

The base station 102 may transmit an SPS/CG configuration 310. For example, the SPS/CG configuration 310 may be an RRC configuration indicating one or more parameters for downlink transmissions in the case of SPS or uplink transmissions in the case of CG. The SPS/CG configuration 310 may include a periodicity of the transmissions. The UE 104 may receive the SPS/CG configuration 310 and store the SPS/CG configuration 310 as a configured SPS or CG.

The base station 102 may transmit a SPS/CG activation 320. For example, the SPS/CG activation 320 may be a DCI for the UE 104. The SPS/CG activation 320 may include one or more parameters to be used for transmissions according to the SPS/CG. For example, parameters that may be signaled in the DCI include: frequency domain resources, time domain resources, a MCS, a DMRS port, a scrambling identifier for DMRS sequence generation, TCI state, or QCL type. The UE 104 may receive the SPS/CG activation 320 and activate a stored SPS/CG configuration 310 indicated by the SPS/CG activation 320 (e.g., based on an index).

The UE 104 may transmit a PUSCH 330 according to an activated CG. The parameters for the PUSCH may include parameters defined in the SPS/CG configuration 310 and/or the SPS/CG activation 320.

The UE 104 may receive a PDSCH 340 according to an activated SPS configuration. The parameters for the PDSCH may include parameters defined in the SPS/CG configuration 310 and/or the SPS/CG activation 320.

At block 350, the base station 102 may determine a parameter change for downlink transmissions, uplink transmissions, or both. For example, channel conditions may change such that parameters of the current SPS/CG configuration are no longer efficient. For instance, if the channel quality deteriorates, the currently configured MCS may result in a high block error rate (BLER). The base station 102 may determine a new parameter to use for downlink transmissions, uplink transmissions, or both.

The base station 102 may transmit a SPS/CG update 360. The SPS/CG update 360 may be any message that includes at least one updated parameter that may be applicable to an SPS/CG configuration. For example, the SPS/CG update 360 may be a specific RRC message or MAC-CE that indicates the at least one parameter to update. In another aspect, the SPS/CG update 360 may be a DCI having a special format for updating parameters. For example, a standard or regulation may define a new DCI format in addition to DCI formats used to signal individual uplink or downlink transmissions or to activate or deactivate a SPS/CG configuration. As another example, the SPS/CG update 360 may be a DCI using an existing format that the UE 104 interprets as including at least one parameter to update. For instance, a DCI scheduling a HARQ retransmission may be interpreted as an update to apply any changes for the HARQ retransmission to the SPS/CG configuration 310. In an aspect, the SPS/CG update 360 may include an index identifying one or more SPS/CG configurations 310.

At block 370, the UE 104 may determine one or more applicable SPS/CG configurations for the SPS/CG update message 360. For example, the UE 104 and/or update component 146 may be configured with one or more rules for determining whether the SPS/CG update message 360 applies to each SPS/CG configuration 310. For example, one rule may indicate that the SPS/CG update message 360 applies only to a single SPS/CG configuration 310 indicated in the SPS/CG update message 360. Another rule may indicate that the SPS/CG update message 360 applies to all SPS/CG configurations 310, or an indicated subset of the SPS/CG configurations 310. For example, the SPS/CG update message 360 may only apply to SPS configurations, CGs, or a signaled set of SPS configurations and/or CGs. In an aspect, the rule may be parameter specific. For example, the rule may indicate one or more parameters (e.g., MCS, TCI state) where an updated parameter in the SPS/CG update message 360 applies to all SPS/CG configurations 310 whereas the SPS/CG update message 360 may not apply to a parameter such as frequency domain resources or time domain resources.

At block 380, the UE 104 may overwrite one or more SPS/CG configuration parameters. For example, the UE 104 may overwrite any parameters of the stored SPS/CG configurations 310 to which the SPS/CG update 360 is applicable that correspond to a parameter in the SPS/CG update 360. That is, the UE 104 may overwrite a value of a parameter of the SPS/CG configuration 310 with a value of a corresponding parameter in the SPS/CG update 360.

The UE 104 may transmit the PUSCH 390 and/or receive the PDSCH 395 according to the updated SPS/CG configurations 310.

Figure 4:
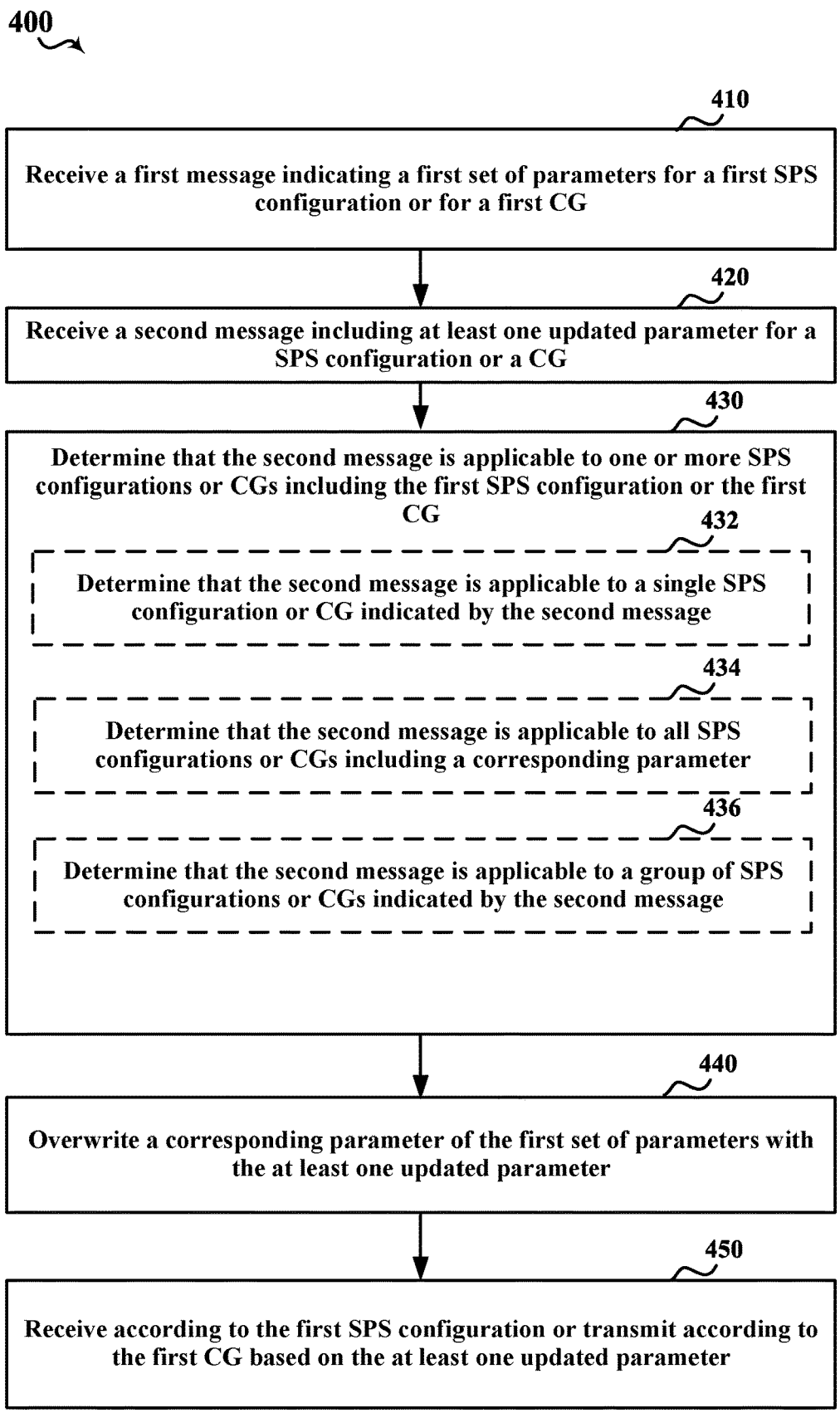
FIG. 4 is a flowchart showing an example method of updating a scheduling configuration for a UE, in accordance with certain aspects of the present description.

FIG. 4 is a flowchart showing an example method 400 of updating a SPS configuration and/or a CG. The method 400 may be performed by the UE 104 including the scheduling configuration component 140 and subcomponents thereof. The method 400 may include communications with one or more base stations 102.

In block 410, the method 400 may include receiving a first message indicating a first set of parameters for a first semi-persistent scheduling (SPS) configuration or for a first configured grant (CG). In an aspect, for example, the UE 104, the processor 512, and/or the modem 514 may execute the activation component 144 to receive the first message indicating a first set of parameters for a first SPS configuration or for a first CG. The first message may be an RRC message configuring the SPS configuration or the CG (e.g., SPS/CG configuration 310), or the first message may be an activation DCI (e.g., SPS/CG activation 320). Thus, the UE 104, the processor 512, and/or the modem 514 executing the scheduling configuration component 140 and/or the activation component 144 or one of its subcomponents may define the means for receiving an activation DCI indicating a first set of parameters for a first semi-persistent scheduling (SPS) configuration or for a first CG.

In block 420, the method 400 may include receiving a second message including at least one updated parameter for a SPS configuration or a CG. In an aspect, for example, the UE 104, the processor 512, and/or the modem 514 may execute the update component 146 to receive a second message including at least one updated parameter for a SPS configuration or a CG. In an aspect, the second message may be a DCI scheduling a retransmission of a transmission according to the first SPS or the first CG. In another aspect, the second message may be a DCI dynamically scheduling a downlink transmission separate from the first SPS or an uplink transmission separate from the first CG. In another aspect, the second message may be a reconfiguration message transmitted as a DCI, media access control—control element (MAC-CE), or RRC message. Thus, the UE 104, the processor 512, and/or the modem 514 executing the scheduling configuration component 140 and/or update component 146 or one of its subcomponents may define the means for receiving a second message including at least one updated parameter for a SPS configuration or a CG.

In block 430, the method 400 may include determining that the second message is applicable to one or more SPS configurations or CGs including the first SPS configuration or the first CG. In an aspect, for example, the UE 104, the processor 512, and/or the modem 514 may execute the update component 146 to determine that the second message is applicable to one or more SPS configurations or CGs including the first SPS configuration or the first CG. The update component 146 may be configured with a rule for the at least one parameter that indicates which SPS configuration and/or CGs are applicable. The update component 146 may determine that the second message is applicable to one or more SPS configurations or CGs based on the rule for the at least one parameter. Thus, the UE 104, the processor 512, and/or the modem 514 executing the scheduling configuration component 140 and/or update component 146 or one of its subcomponents may define the means for determining that the second message is applicable to one or more SPS configurations or CGs including the first SPS configuration or the first CG.

For example, in sub-block 432, the block 430 may include determining that the second message is applicable to a single SPS configuration or CG indicated by the second message. For example, the update component 146 may be configured with a rule to determine that the second message is applicable to a single SPS configuration or CG indicated by the second message.

As another example, in sub-block 434, the block 430 may include determining that the second message is applicable to all SPS configurations or CGs including a corresponding parameter. For example, the update component 146 may be configured with a rule to determine that the second message is applicable to all SPS configurations or CGs including a corresponding parameter. The corresponding parameter may correspond to the at least one parameter of the second message. That is, the corresponding parameter may be the same parameter as the at least one parameter, but the at least one parameter may have a different value than the value of the corresponding parameter for the SPS configuration or CG.

As another example, at sub-block 436, the block 430 may include determining that the second message is applicable to one or more SPS configurations or CGs comprises determining that the second message is applicable to a group of SPS configurations or CGs indicated by the second message. For example, the update component 146 may be configured with a rule to determine that the second message is applicable to a group of SPS configurations or CGs indicated by the second message.

In block 440, the method 400 may include overwriting a corresponding parameter of the first set of parameters with the at least one updated parameter. In an aspect, for example, the UE 104, the processor 512, and/or the modem 514 may execute the overwriting component 148 to overwrite a corresponding parameter of the first set of parameters with the at least one updated parameter. Thus, the UE 104, the processor 512, and/or the modem 514 executing the scheduling configuration component 140 and/or overwriting component 148 or one of its subcomponents may define the means for overwriting a corresponding parameter of the first set of parameters with the at least one updated parameter In block 450, the method 400 may include receiving according to the first SPS configuration or transmitting according to the first CG based on the at least one updated parameter. In an aspect, for example, the UE 104, the processor 512 and/or the modem 514 may control the transceiver 502 to receive according to the first SPS configuration or transmit according to the first CG based on the at least one updated parameter. Thus, the UE 104, the processor 512, and/or the modem 514 executing the scheduling configuration component 140 to control the transceiver 502 or one of its subcomponents may define the means for receiving according to the first SPS configuration or means for transmitting according to the first CG based on the at least one updated parameter.

Figure 5:
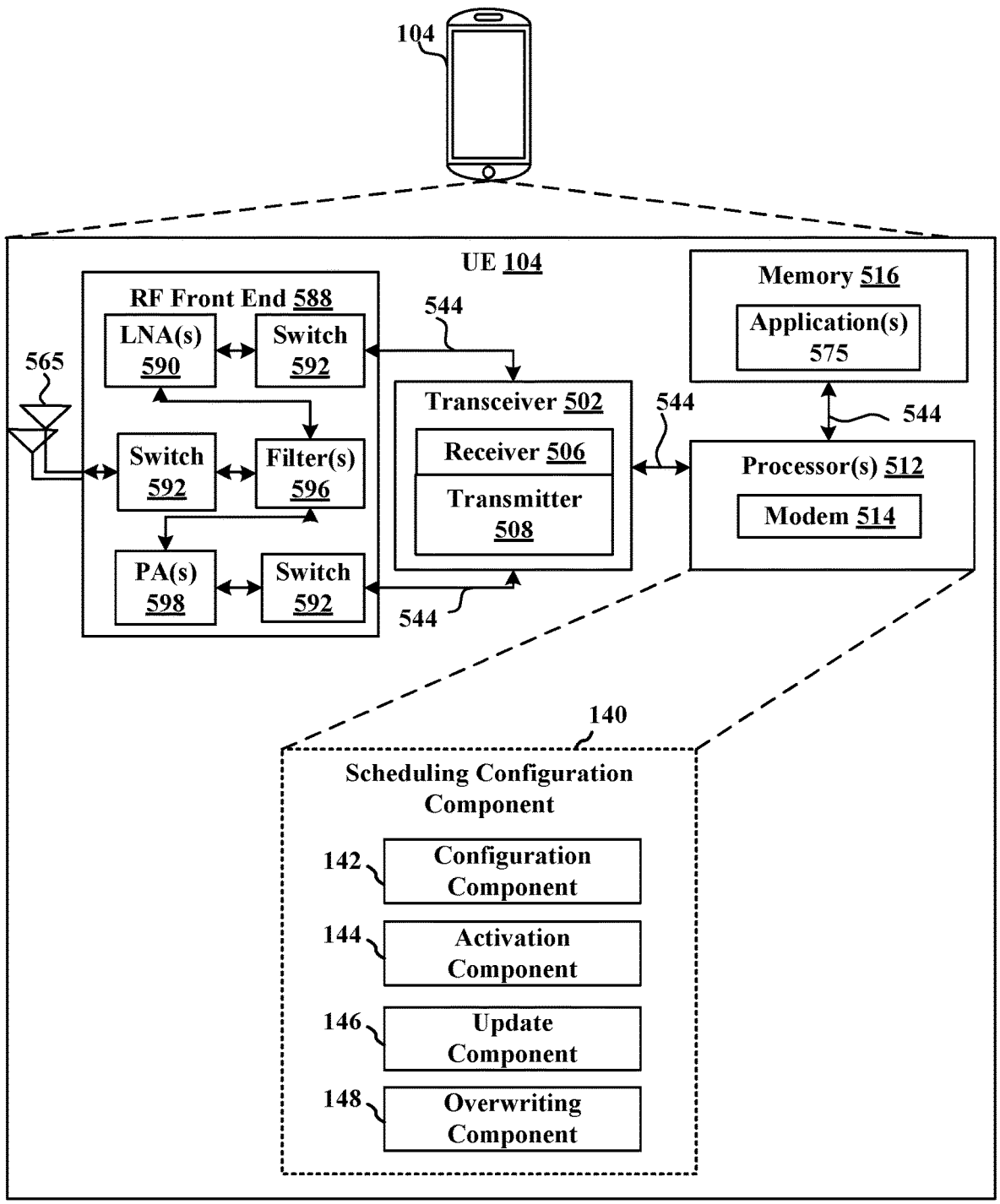
FIG. 5 is a schematic diagram of example components of the UE of FIG. 1, in accordance with certain aspects of the present description.

Referring to FIG. 5, one example of an implementation of UE 104 may include a variety of components, some of which have already been described above, but including components such as one or more processors 512 and memory 516 and transceiver 502 in communication via one or more buses 544, which may operate in conjunction with modem 514, and scheduling configuration component 140 to enable one or more of the functions described herein related to updating one or more SPS configurations and/or CGs. Further, the one or more processors 512, modem 514, memory 516, transceiver 502, RF front end 588 and one or more antennas 565 may be configured to support voice and/or data calls (simultaneously or non-simultaneously) in one or more radio access technologies. The antennas 565 may include one or more antennas, antenna elements, and/or antenna arrays.

In an aspect, the one or more processors 512 may include a modem 514 that uses one or more modem processors. The various functions related to scheduling configuration component 140 may be included in modem 514 and/or processors 512 and, in an aspect, may be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with scheduling configuration component 140 may be performed by transceiver 502.

Also, memory 516 may be configured to store data used herein and/or local versions of applications 575, scheduling configuration component 140 and/or one or more of subcomponents thereof being executed by at least one processor 512. Memory 516 may include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining scheduling configuration component 140 and/or one or more of subcomponents thereof, and/or data associated therewith, when UE 104 is operating at least one processor 512 to execute scheduling configuration component 140 and/or one or more subcomponents thereof.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one base station 102. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, UE 104 may include RF front end 588, which may operate in communication with one or more antennas 565 and transceiver 502 for receiving and transmitting radio transmissions, for example, wireless communications transmitted by at least one base station 102 or wireless transmissions transmitted by UE 104. RF front end 588 may be connected to one or more antennas 565 and may include one or more low-noise amplifiers (LNAs) 590, one or more switches 592, one or more power amplifiers (PAs) 598, and one or more filters 596 for transmitting and receiving RF signals.

In an aspect, LNA 590 may amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 may be used by RF front end 588 to filter a received signal to obtain an input RF signal. Similarly, in an aspect, for example, a respective filter 596 may be used to filter an output from a respective PA 598 to produce an output signal for transmission. In an aspect, each filter 596 may be connected to a specific LNA 590 and/or PA 598. In an aspect, RF front end 588 may use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver 502 may be tuned to operate at specified frequencies such that UE 104 can communicate with, for example, one or more base stations 102 or one or more cells associated with one or more base stations 102. In an aspect, for example, modem 514 may configure transceiver 502 to operate at a specified frequency and power level based on the UE configuration of the UE 104 and the communication protocol used by modem 514.

In an aspect, modem 514 may be a multiband-multimode modem, which can process digital data and communicate with transceiver 502 such that the digital data is sent and received using transceiver 502. In an aspect, modem 514 may be multiband and be configured to support multiple frequency bands for a specific communications protocol. In an aspect, modem 514 may be multimode and be configured to support multiple operating networks and communications protocols. In an aspect, modem 514 may control one or more components of UE 104 (e.g., RF front end 588, transceiver 502) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 6:
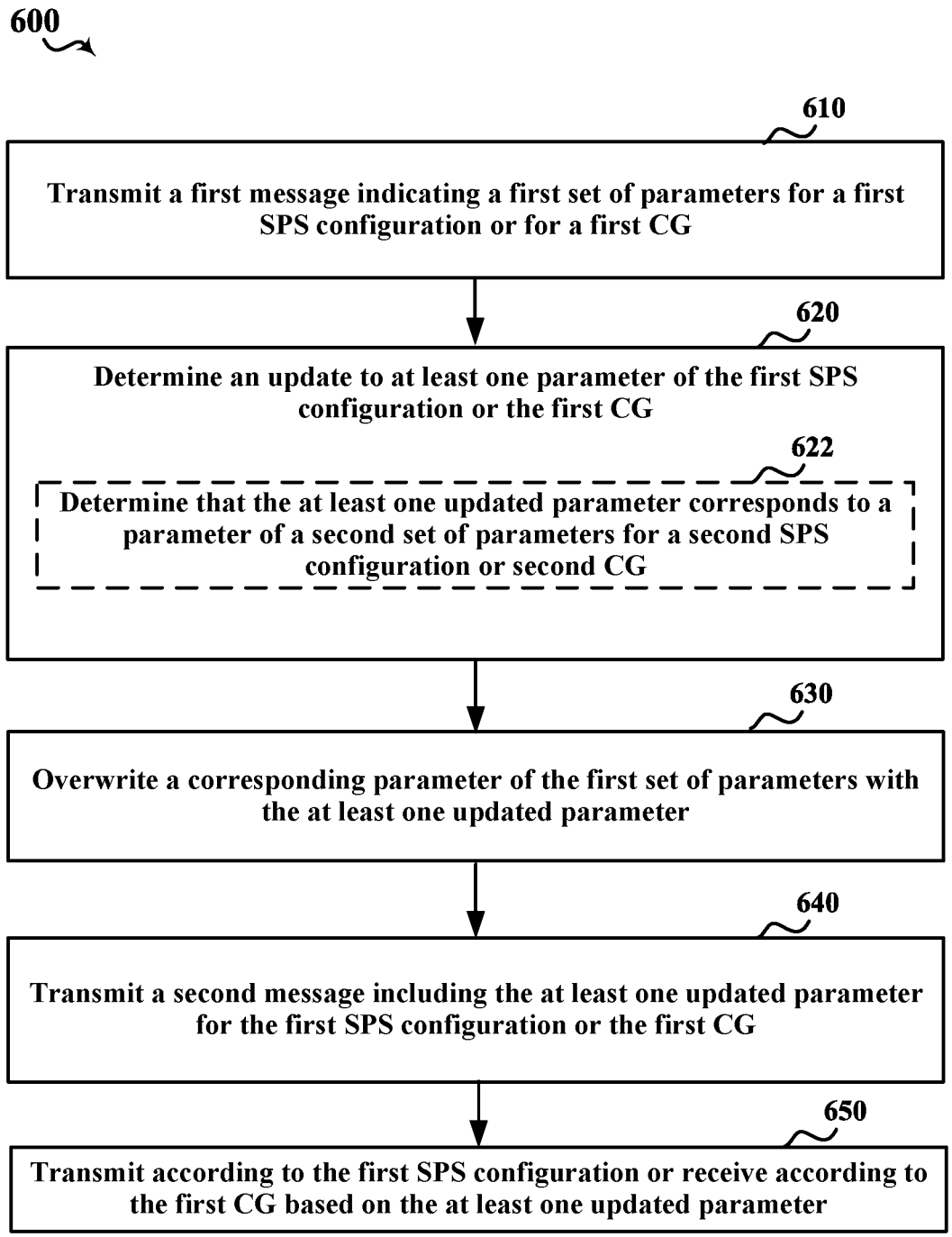
FIG. 6 is a flowchart showing an example method of updating a scheduling configuration by a base station, in accordance with certain aspects of the present description.

FIG. 6 is a flowchart showing an example method 600 of updating a SPS configuration and/or a CG. The method 600 may be performed by the base station 102 including the scheduling configuration component 198 and subcomponents thereof. The method 600 may include communications with one or more UEs 104.

At block 610, the method 600 may include transmitting a first message indicating a first set of parameters for a first SPS configuration or for a first CG. In an aspect, for example, the base station 102, the processor 712, and/or the modem 714 may execute the scheduling configuration component 198 and/or the configuration component 742 and/or the activation component 744 to transmit a first message indicating a first set of parameters for a first SPS configuration or for a first CG. Thus, the base station 102, the processor 712, and/or the modem 714 executing the scheduling configuration component 198, the configuration component 742, and/or the activation component 744 or one of its subcomponents may define the means for transmitting a first message indicating a first set of parameters for a first SPS configuration or for a first CG.

At block 620, the method 600 may include determining an update to at least one parameter of the first SPS configuration or the first CG. In an aspect, for example, the base station 102, the processor 712, and/or the modem 714 may execute the scheduling configuration component 198 and/or the update component 746 to determine an update to at least one parameter of the first SPS configuration or the first CG. For example, the parameter change may be due a change in channel conditions such that parameters of the current SPS/CG configuration are no longer efficient. For instance, if the channel quality has deteriorated and the currently configured MCS would result in a high BLER, the scheduling configuration component 198 and/or the update component 746 may determine an updated MCS to use for transmissions. Similarly, the scheduling configuration component 198 and/or the update component 746 may determine an updated parameter for a DMRS port, a scrambling identifier for DMRS sequence generation, TCI state, or QCL type. Thus, the base station 102, the processor 712, and/or the modem 714 executing the scheduling configuration component 198 and/or the update component 746 or one of its subcomponents may define the means for determining an update to at least one parameter of the first SPS configuration or the first CG.

In an aspect, at sub-block 622, the block 620 may include determining that the at least one updated parameter corresponds to a parameter of a second set of parameters for a second SPS configuration or second CG. For example, the base station 102, the processor 712, and/or the modem 714 may execute the scheduling configuration component 198 and/or the update component 746 to determine that the at least one updated parameter corresponds to the parameter of the second set of parameters for the second SPS configuration or second CG. For example, two SPS configurations may use the same MCS. Accordingly, the scheduling configuration component 198 and/or the update component 746 may apply the determined parameter update to the second SPS configuration or second CG.

At block 630, the method 600 may include overwriting a corresponding parameter of the first set of parameters with the at least one updated parameter. In an aspect, for example, the base station 102, the processor 712, and/or the modem 714 may execute the scheduling configuration component 198 and/or the overwriting component 748 to overwrite a corresponding parameter of the first set of parameters with the at least one updated parameter. In an aspect, for example where sub-block 622 is performed, the block 630 may be repeated for a set of parameters for each corresponding SPS configuration or CG. Thus, the base station 102, the processor 712, and/or the modem 714 executing the scheduling configuration component 198 and/or the overwriting component 748 or one of its subcomponents may define the means for overwriting a corresponding parameter of the first set of parameters with the at least one updated parameter.

At block 640, the method 600 may include transmitting a second message including the at least one updated parameter for the first SPS configuration or the first CG. In an aspect, for example, the base station 102, the processor 712, and/or the modem 714 may execute the scheduling configuration component 198 and/or the activation component 744 to control the transceiver 702 to transmit a second message including the at least one updated parameter for the first SPS configuration or the first CG. In an aspect, where the at least one updated parameter applies to more than one SPS configuration or CG, the scheduling configuration component 198 may transmit a single second message that applies to each of the applicable SPS configurations or CGs. The scheduling configuration component 198 may include an identifier of each applicable SPS configuration or CG, or the UE 104 may determine the applicable SPS configurations or CGs as described above with respect to block 430. Thus, the base station 102, the processor 712, and/or the modem 714 executing the scheduling configuration component or one of its subcomponents to control the transceiver 702 may define the means for transmitting a second message including the at least one updated parameter for the first SPS configuration or the first CG.

At block 650, the method 600 may include transmitting according to the first SPS configuration or receiving according to the first CG based on the at least one updated parameter. In an aspect, for example, the base station 102, the processor 712, and/or the modem 714 may execute scheduling configuration component 198 to transmit according to the first SPS configuration or receive according to the first CG based on the at least one updated parameter. In an aspect, for example where sub-block 622 is performed, the block 650 may be repeated for each corresponding SPS configuration or CG. Thus, the base station 102, the processor 712, and/or the modem 714 executing the scheduling configuration component or one of its subcomponents to control the transceiver 702 may define the means for transmitting according to the first SPS configuration or receiving according to the first CG based on the at least one updated parameter.

Referring to FIG. 7, one example of an implementation of base station 102 may include a variety of components, some of which have already been described above, but including components such as one or more processors 712 and memory 716 and transceiver 702 in communication via one or more buses 754, which may operate in conjunction with modem 714 and scheduling configuration component 198 to enable one or more of the functions described herein related to updating scheduling configurations.

The transceiver 702, receiver 706, transmitter 708, one or more processors 712, memory 716, applications 775, buses 754, RF front end 788, LNAs 790, switches 792, filters 796, PAs 798, and one or more antennas 765 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Some Further Example Implementations

An example method of wireless communication for a UE, comprising: receiving a first message indicating a first set of parameters for a first semi-persistent scheduling (SPS) configuration or for a first CG; receiving a second message including at least one updated parameter for a SPS configuration or a CG; determining that the second message is applicable to one or more SPS configurations or CGs including the first SPS configuration or the first CG; overwriting a corresponding parameter of the first set of parameters with the at least one updated parameter; and receiving according to the first SPS configuration or transmitting according to the first CG based on the at least one updated parameter.

The above example method, wherein the second message is a downlink control information (DCI) scheduling a retransmission of a transmission according to the first SPS configuration or the first CG.

Any of the above example methods, wherein the second message is a DCI dynamically scheduling a downlink transmission separate from the first SPS configuration or an uplink transmission separate from the first CG.

Any of the above example methods, wherein the second message is a reconfiguration message transmitted as a DCI, MAC-CE, or RRC message.

Any of the above example methods, wherein determining that the second message is applicable to one or more SPS configurations or CGs comprises determining that the second message is applicable to a single SPS configuration or CG indicated by the second message.

Any of the above example methods, wherein determining that the second message is applicable to one or more SPS configurations or CGs comprises determining that the second message is applicable to all SPS configurations or CGs including a corresponding parameter.

Any of the above example methods, wherein determining that the second message is applicable to one or more SPS configurations or CGs is based on a rule for the at least one updated parameter.

Any of the above example methods, wherein determining that the second message is applicable to one or more SPS configurations or CGs comprises determining that the second message is applicable to a group of SPS configurations or CGs indicated by the second message.

Any of the above example methods, wherein the first message is an activation DCI.

An example UE, comprising a memory storing computer executable instructions; and a processor communicatively coupled to the memory and configured to execute the instructions to: receive a first message indicating a first set of parameters for a first semi-persistent scheduling (SPS) configuration or for a first configured grant (CG); receive a second message including at least one updated parameter for a SPS configuration or a CG; determine that the second message is applicable to one or more SPS configurations or CGs including the first SPS configuration or the first CG; overwrite a corresponding parameter of the first set of parameters with the at least one updated parameter; and receive according to the first SPS configuration or transmit according to the first CG based on the at least one updated parameter.

The above example UE, wherein the second message is a downlink control information (DCI) scheduling a retransmission of a transmission according to the first SPS configuration or the first CG.

Any of the above example UEs, wherein the second message is a DCI dynamically scheduling a downlink transmission separate from the first SPS configuration or an uplink transmission separate from the first CG.

Any of the above example UEs, wherein the second message is a reconfiguration message transmitted as a DCI, media access control—control element (MAC-CE), or radio resource control (RRC) message.

Any of the above example UEs, wherein the processor is configured to execute the instructions to determine that the second message is applicable to a single SPS configuration or CG indicated by the second message.

Any of the above example UEs, wherein the processor is configured to execute the instructions to determine that the second message is applicable to all SPS configurations or CGs including a corresponding parameter.

Any of the above example UEs, wherein the processor is configured to execute the instructions to determine that the second message is applicable to one or more SPS configurations or CGs based on a rule for the at least one updated parameter.

Any of the above example UEs, wherein the processor is configured to execute the instructions to determine that the second message is applicable to a group of SPS configurations or CGs indicated by the second message.

Any of the above example UEs, wherein the first message is an activation downlink control information (DCI).

A second example UE, comprising: means for receiving a first message indicating a first set of parameters for a first semi-persistent scheduling (SPS) configuration or for a first configured grant (CG); means for receiving a second message including at least one updated parameter for a SPS configuration or a CG; means for determining that the second message is applicable to one or more SPS configurations or CGs including the first SPS configuration or the first CG; means for overwriting a corresponding parameter of the first set of parameters with the at least one updated parameter; means for receiving according to the first SPS configuration based on the at least one updated parameter; and means for transmitting according to the first CG based on the at least one updated parameter.

The above second example UE, wherein the second message is a downlink control information (DCI) scheduling a retransmission of a transmission according to the first SPS or the first CG.

The above second example UE, wherein the second message is a DCI dynamically scheduling a downlink transmission separate from the first SPS or an uplink transmission separate from the first CG.

The above second example UE, wherein the second message is a reconfiguration message transmitted as a DCI, media access control—control element (MAC-CE), or radio resource control (RRC) message.

The above second example UE, wherein determining that the second message is applicable to one or more SPS configurations or CGs comprises determining that the second message is applicable to a single SPS configuration or CG indicated by the second message.

The above second example UE, wherein the means determining that the second message is applicable to one or more SPS configurations or CGs is configured to determine that the second message is applicable to all SPS configurations or CGs including a corresponding parameter.

The above second example UE, wherein the means for determining that the second message is applicable to one or more SPS configurations or CGs is configured to determine based on a rule for the at least one updated parameter.

The above second example UE, wherein means for determining that the second message is applicable to one or more SPS configurations or CGs is configured to determine that the second message is applicable to a group of SPS configurations or CGs indicated by the second message.

The above second example UE, wherein the first message is an activation downlink control information (DCI).

An example non-transitory computer-readable medium storing computer executable instructions, comprising instructions to: receive a first message indicating a first set of parameters for a first semi-persistent scheduling (SPS) configuration or for a first configured grant (CG); receive a second message including at least one updated parameter for a SPS configuration or a CG; determine that the second message is applicable to one or more SPS configurations or CGs including the first SPS configuration or the first CG; overwrite a corresponding parameter of the first set of parameters with the at least one updated parameter; and receive according to the first SPS configuration or transmit according to the first CG based on the at least one updated parameter.

The above non-transitory computer-readable medium, wherein the second message is a downlink control information (DCI) scheduling a retransmission of a transmission according to the first SPS or the first CG.

Any of the above non-transitory computer-readable mediums, wherein the second message is a DCI dynamically scheduling a downlink transmission separate from the first SPS or an uplink transmission separate from the first CG.

Any of the above non-transitory computer-readable mediums, wherein the second message is a reconfiguration message transmitted as a DCI, media access control—control element (MAC-CE), or radio resource control (RRC) message.

Any of the above non-transitory computer-readable mediums, wherein the instructions to determine that the second message is applicable to one or more SPS configurations or CGs includes instructions to determine that the second message is applicable to a single SPS configuration or CG indicated by the second message.

Any of the above non-transitory computer-readable mediums, wherein the instructions to determine that the second message is applicable to one or more SPS configurations or CGs includes instructions to determine that the second message is applicable to all SPS configurations or CGs including a corresponding parameter.

Any of the above non-transitory computer-readable mediums, wherein the instructions to determine that the second message is applicable to one or more SPS configurations or CGs includes instructions to determine that the second message is applicable to one or more SPS configurations or CGs based on a rule for the at least one updated parameter.

Any of the above non-transitory computer-readable mediums, wherein the instructions to determine that the second message is applicable to one or more SPS configurations or CGs includes instructions to determine that the second message is applicable to a group of SPS configurations or CGs indicated by the second message.

Any of the above non-transitory computer-readable mediums, wherein the first message is an activation downlink control information (DCI).

A second example method of wireless communication, comprising: transmitting a first message indicating a first set of parameters for a first semi-persistent scheduling (SPS) configuration or for a first configured grant (CG); determining an update to at least one parameter of the first SPS configuration or the first CG; overwriting a corresponding parameter of the first set of parameters with the at least one updated parameter; transmitting a second message including the at least one updated parameter for the first SPS configuration or the first CG; and transmitting according to the first SPS configuration or receiving according to the first CG based on the at least one updated parameter.

The above second example method, further comprising: determining that the at least one updated parameter corresponds to a parameter of a second set of parameters for a second SPS configuration or second CG; overwriting the corresponding parameter of second set of parameters with the at least one updated parameter; and transmitting according to the second SPS configuration or receiving according to the second CG based on the at least one updated parameter.

Any of the above second example methods, wherein the second message is a downlink control information (DCI) scheduling a retransmission of a transmission according to the first SPS or the first CG.

Any of the above second example methods, wherein the second message is a DCI dynamically scheduling a downlink transmission separate from the first SPS or an uplink transmission separate from the first CG.

Any of the above second example methods, wherein the second message is a reconfiguration message transmitted as a DCI, media access control—control element (MAC-CE), or radio resource control (RRC) message.

Any of the above second example methods, wherein the first message is an activation downlink control information (DCI).

A first example apparatus for wireless communications, comprising: a memory storing computer-executable instructions; and a processor communicatively coupled with the memory and configured to execute the instructions to perform any of the above second example methods.

A second example apparatus for wireless communications, comprising: means for performing any of the above second example methods.

A second example non-transitory computer-readable medium storing computer-executable instructions to perform any of the above second example methods.

What is claimed is:

1. A method of wireless communication for a user equipment (UE), comprising:
   receiving a first message indicating a first set of parameters for a first semi-persistent scheduling (SPS) configuration or for a first configured grant (CG), wherein the first message is a first downlink control information (DCI) that indicates activation of the first SPS configuration or the first CG;
   receiving a second message including at least one updated parameter for a SPS configuration or a CG, wherein the second message is a DCI dynamically scheduling a downlink transmission separate from the first SPS configuration or an uplink transmission separate from the first CG;
   determining that the second message is applicable to one or more SPS configurations or CGs including the first SPS configuration or the first CG;
   overwriting a corresponding parameter of the first set of parameters with the at least one updated parameter; and
   receiving according to the first SPS configuration or transmitting according to the first CG based on the at least one updated parameter.

2. The method of claim 1, wherein determining that the second message is applicable to one or more SPS configurations or CGs comprises determining that the second message is applicable to a single SPS configuration or CG indicated by the second message.

3. The method of claim 1, wherein determining that the second message is applicable to one or more SPS configurations or CGs comprises determining that the second message is applicable to all SPS configurations or CGs including a corresponding parameter.

4. The method of claim 1, wherein determining that the second message is applicable to one or more SPS configurations or CGs is based on a rule for the at least one updated parameter.

5. The method of claim 1, wherein determining that the second message is applicable to one or more SPS configurations or CGs comprises determining that the second message is applicable to a group of SPS configurations or CGs indicated by the second message.

6. A user equipment (UE) comprising:
   a memory storing computer executable instructions; and
   a processor communicatively coupled to the memory and configured to execute the instructions to:
   receive a first message indicating a first set of parameters for a first semi-persistent scheduling (SPS) configuration or for a first configured grant (CG), wherein the first message is a first downlink control information (DCI) that indicates activation of the first SPS configuration or the first CG;
   receive a second message including at least one updated parameter for a SPS configuration or a CG, wherein the second message is a DCI dynamically scheduling a downlink transmission separate from the first SPS configuration or an uplink transmission separate from the first CG;
   determine that the second message is applicable to one or more SPS configurations or CGs including the first SPS configuration or the first CG;
   overwrite a corresponding parameter of the first set of parameters with the at least one updated parameter; and
   receive according to the first SPS configuration or transmit according to the first CG based on the at least one updated parameter.

7. The UE of claim 6, wherein the processor is configured to execute the instructions to determine that the second message is applicable to a single SPS configuration or CG indicated by the second message.

8. The UE of claim 6, wherein the processor is configured to execute the instructions to determine that the second message is applicable to all SPS configurations or CGs including a corresponding parameter.

9. The UE of claim 6, wherein the processor is configured to execute the instructions to determine that the second message is applicable to one or more SPS configurations or CGs based on a rule for the at least one updated parameter.

10. The UE of claim 6, wherein the processor is configured to execute the instructions to determine that the second message is applicable to a group of SPS configurations or CGs indicated by the second message.

11. A user equipment (UE), comprising:
    means for receiving a first message indicating a first set of parameters for a first semi-persistent scheduling (SPS) configuration or for a first configured grant (CG), wherein the first message is a first downlink control information (DCI) that indicates activation of the first SPS configuration or the first CG;
    means for receiving a second message including at least one updated parameter for a SPS configuration or a CG, wherein the second message is a DCI dynamically scheduling a downlink transmission separate from the first SPS configuration or an uplink transmission separate from the first CG;
    means for determining that the second message is applicable to one or more SPS configurations or CGs including the first SPS configuration or the first CG;
    means for overwriting a corresponding parameter of the first set of parameters with the at least one updated parameter;
    means for receiving according to the first SPS configuration based on the at least one updated parameter; and
    means for transmitting according to the first CG based on the at least one updated parameter.

12. The UE of claim 11, wherein the means for determining that the second message is applicable to one or more SPS configurations or CGs is configured to determine that the second message is applicable to a single SPS configuration or CG indicated by the second message.

13. The UE of claim 11, wherein the means for determining that the second message is applicable to one or more SPS configurations or CGs is configured to determine that the second message is applicable to all SPS configurations or CGs including a corresponding parameter.

14. The UE of claim 11, wherein the means for determining that the second message is applicable to one or more SPS configurations or CGs is configured to determine based on a rule for the at least one updated parameter.

15. The UE of claim 11, wherein means for determining that the second message is applicable to one or more SPS configurations or CGs is configured to determine that the second message is applicable to a group of SPS configurations or CGs indicated by the second message.

16. A non-transitory computer-readable medium storing computer executable instructions, comprising instructions to:
- receive a first message indicating a first set of parameters for a first semi-persistent scheduling (SPS) configuration or for a first configured grant (CG), wherein the first message is a first downlink control information (DCI) that indicates activation of the first SPS configuration or the first CG;
- receive a second message including at least one updated parameter for a SPS configuration or a CG, wherein the second message is a DCI dynamically scheduling a downlink transmission separate from the first SPS configuration or an uplink transmission separate from the first CG;
- determine that the second message is applicable to one or more SPS configurations or CGs including the first SPS configuration or the first CG;
- overwrite a corresponding parameter of the first set of parameters with the at least one updated parameter; and
- receive according to the first SPS configuration or transmit according to the first CG based on the at least one updated parameter.

17. The non-transitory computer-readable medium of claim 16, wherein the instructions to determine that the second message is applicable to one or more SPS configurations or CGs includes instructions to determine that the second message is applicable to a single SPS configuration or CG indicated by the second message.

18. The non-transitory computer-readable medium of claim 16, wherein the instructions to determine that the second message is applicable to one or more SPS configurations or CGs includes instructions to determine that the second message is applicable to all SPS configurations or CGs including a corresponding parameter.

19. The non-transitory computer-readable medium of claim 16, wherein the instructions to determine that the second message is applicable to one or more SPS configurations or CGs includes instructions to determine that the second message is applicable to one or more SPS configurations or CGs based on a rule for the at least one updated parameter.

20. The non-transitory computer-readable medium of claim 16, wherein the instructions to determine that the second message is applicable to one or more SPS configurations or CGs includes instructions to determine that the second message is applicable to a group of SPS configurations or CGs indicated by the second message.

* * * * *